United States Patent
Fouda et al.

(10) Patent No.: US 10,920,583 B2
(45) Date of Patent: Feb. 16, 2021

(54) MONITORING WATER FLOOD LOCATION USING POTENTIALS BETWEEN CASING AND CASING-MOUNTED ELECTRODES

(71) Applicant: Halliburton Energy Services, Inc., Houston, TX (US)

(72) Inventors: Ahmed Elsayed Fouda, Houston, TX (US); Glenn Andrew Wilson, Houston, TX (US); Burkay Donderici, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 308 days.

(21) Appl. No.: 15/763,107

(22) PCT Filed: Nov. 18, 2015

(86) PCT No.: PCT/US2015/061385
§ 371 (c)(1),
(2) Date: Mar. 24, 2018

(87) PCT Pub. No.: WO2017/086957
PCT Pub. Date: May 26, 2017

(65) Prior Publication Data
US 2018/0274361 A1     Sep. 27, 2018

(51) Int. Cl.
*E21B 47/113*     (2012.01)
*E21B 43/20*      (2006.01)
*G01V 3/20*       (2006.01)

(52) U.S. Cl.
CPC ............ *E21B 47/113* (2020.05); *E21B 43/20* (2013.01); *G01V 3/20* (2013.01); *Y02A 90/30* (2018.01)

(58) Field of Classification Search
CPC ... G01V 3/24; G01V 3/22; G01V 3/18; G01V 3/20; G01V 3/28; G01V 3/26; G01V 3/30; E21B 47/113; E21B 47/10; E21B 47/102; E21B 47/003; E21B 47/006; E21B 47/047; E21B 43/20; Y02A 90/342
See application file for complete search history.

(56) References Cited

U.S. PATENT DOCUMENTS

| 4,045,724 A * | 8/1977 | Shuck ..................... G01V 3/30 324/338 |
| 4,399,359 A | 8/1983 | Fertl et al. |
| 2011/0100632 A1 | 5/2011 | Dinariev et al. |

(Continued)

FOREIGN PATENT DOCUMENTS

| WO | 2011115646 A1 | 9/2011 |
| WO | 2017086957 A1 | 5/2017 |

*Primary Examiner* — Son T Le
*Assistant Examiner* — Dustin R Dickinson
(74) *Attorney, Agent, or Firm* — Thomas Rooney; Parker Justiss, P.C.

(57) ABSTRACT

A system for locating water floods, in some embodiments, comprises: multiple transducers for coupling to a borehole casing to inject current into a formation within which the casing is disposed; and multiple electrodes, each of the electrodes coupled to a different one of the multiple transducers when coupled to the casing, wherein each of the multiple transducers is used to determine a potential between the casing and a corresponding one of the multiple electrodes to which the transducer is coupled, wherein the potentials from the multiple transducers are used to determine a water flood location.

20 Claims, 14 Drawing Sheets

(56) References Cited

U.S. PATENT DOCUMENTS

| | | | |
|---|---|---|---|
| 2012/0059616 A1* | 3/2012 | Zhao | ............... G01R 35/00 702/85 |
| 2013/0080062 A1 | 3/2013 | Aamodt et al. | |
| 2014/0222343 A1 | 8/2014 | Samson et al. | |

* cited by examiner

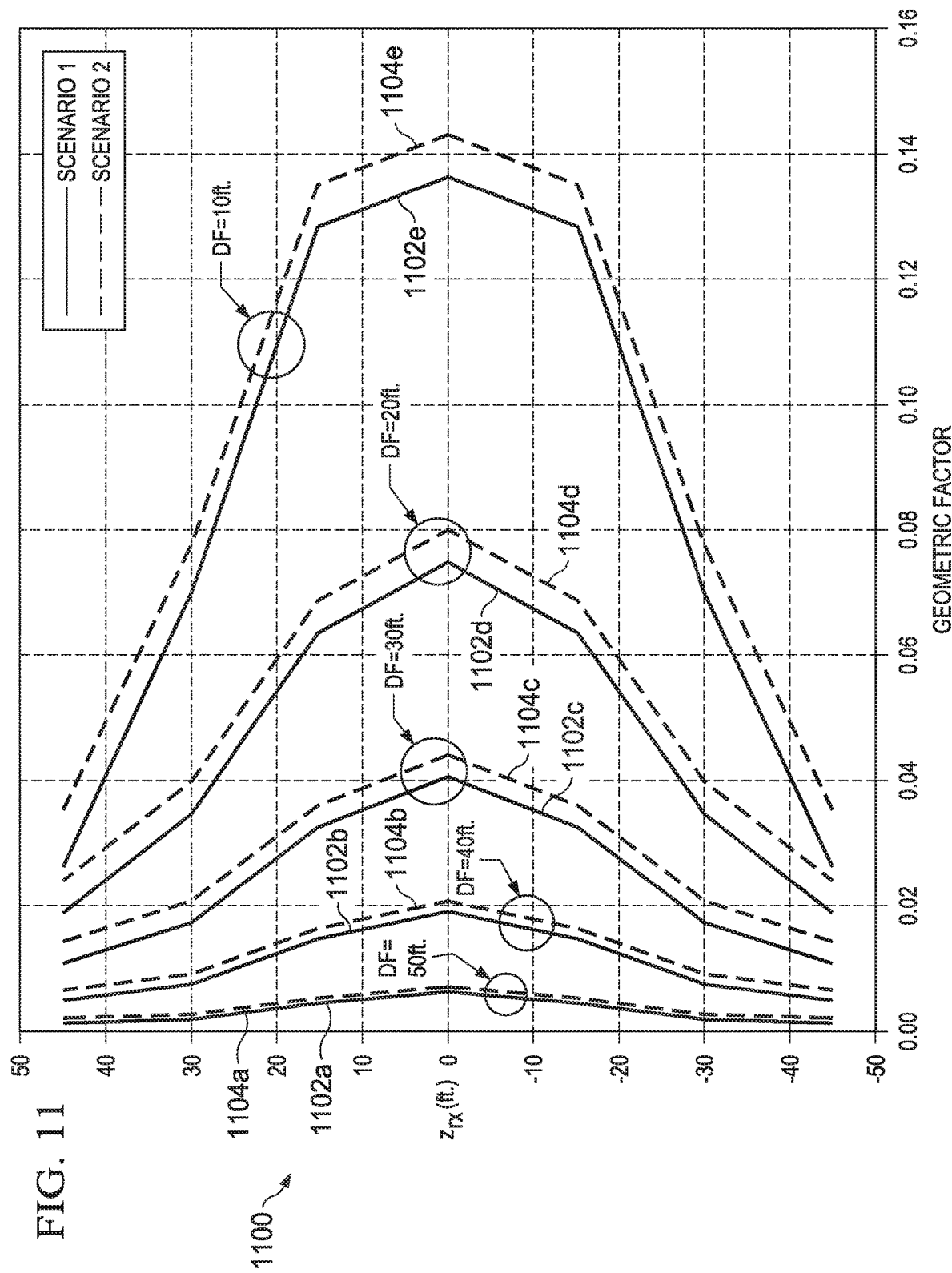

MONITORING WATER FLOOD LOCATION USING POTENTIALS BETWEEN CASING AND CASING-MOUNTED ELECTRODES

CROSS-REFERENCE TO RELATED APPLICATION

This application is the National Stage of, and therefore claims the benefit of, International Application No. PCT/US2015/061385 filed on Nov. 18, 2015, entitled "MONITORING WATER FLOOD LOCATION USING POTENTIALS BETWEEN CASING AND CASING-MOUNTED ELECTRODES," which was published in English under International Publication Number WO 2017/086957 on May 26, 2017. The above application is commonly assigned with this National Stage application and is incorporated herein by reference in its entirety.

BACKGROUND

In some enhanced oil recovery efforts, water is injected into a dead well to increase hydrocarbon throughput in an adjacent, producing well. The injected water approaches the producing well in what is called a "water flood." If the water flood breaks through to the producing well, the fluid produced by the producing well will become contaminated with the water. Existing monitoring techniques (e.g., electric field measurement techniques) often fail to detect such water floods until they are too close to the producing well and have already begun to dilute the hydrocarbons that the well produces, resulting in significant financial losses.

BRIEF DESCRIPTION OF THE DRAWINGS

Accordingly, there are disclosed in the drawings and in the following description systems and methods for monitoring the locations of water floods by measuring potentials between a casing and electrodes circumferentially mounted on the casing. In the drawings:

FIG. 11 is a geometric factor graph corresponding to the embodiments shown in FIGS. 9 and 10.

Figure 1:
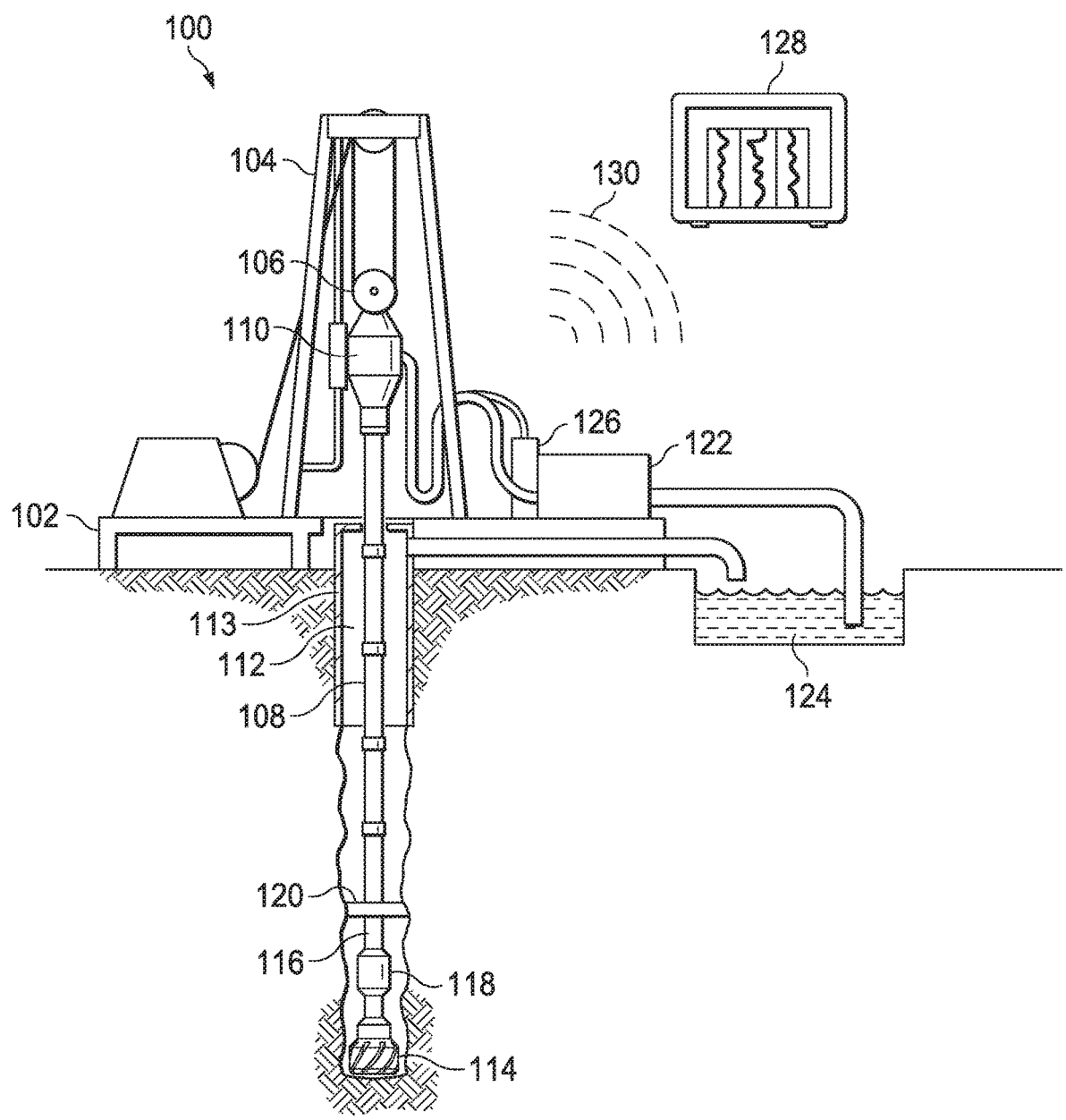
FIG. 1 is a schematic diagram of a drilling environment.

It should be understood, however, that the specific embodiments given in the drawings and detailed description thereto do not limit the disclosure. On the contrary, they provide the foundation for one of ordinary skill to discern the alternative forms, equivalents, and modifications that are encompassed together with one or more of the given embodiments in the scope of the appended claims.

DETAILED DESCRIPTION

Disclosed herein are various techniques for monitoring the locations of water floods adjacent to a well. A water flood approaching a well causes resistivity changes in the formation surrounding the well. The significance of these formation resistivity changes increases with greater proximity to the water flood. Accordingly, the techniques disclosed herein include injecting current into the formation surrounding the well and measuring potentials between a well casing and electrodes mounted circumferentially about the casing. Although the current is injected (e.g., via the casing) in an azimuthally uniform manner, the potentials measured at the different electrodes will vary depending on their respective proximities to the water flood. Because these electrode potentials directly reflect water flood proximity, they can be measured and analyzed to determine the locations of the water floods.

Figure 2:
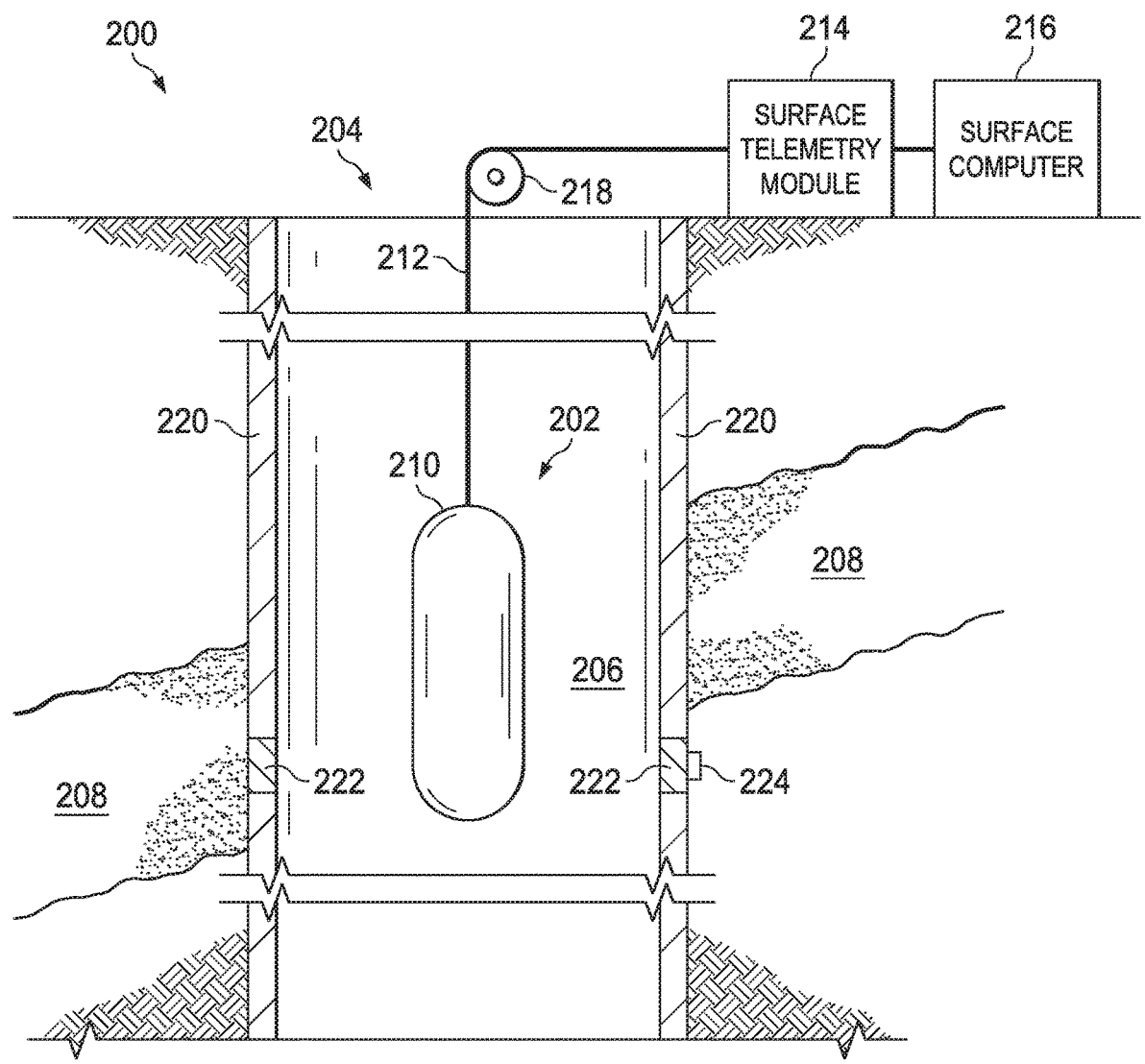
FIG. 2 is a schematic diagram of a wireline environment.
Figure 3:
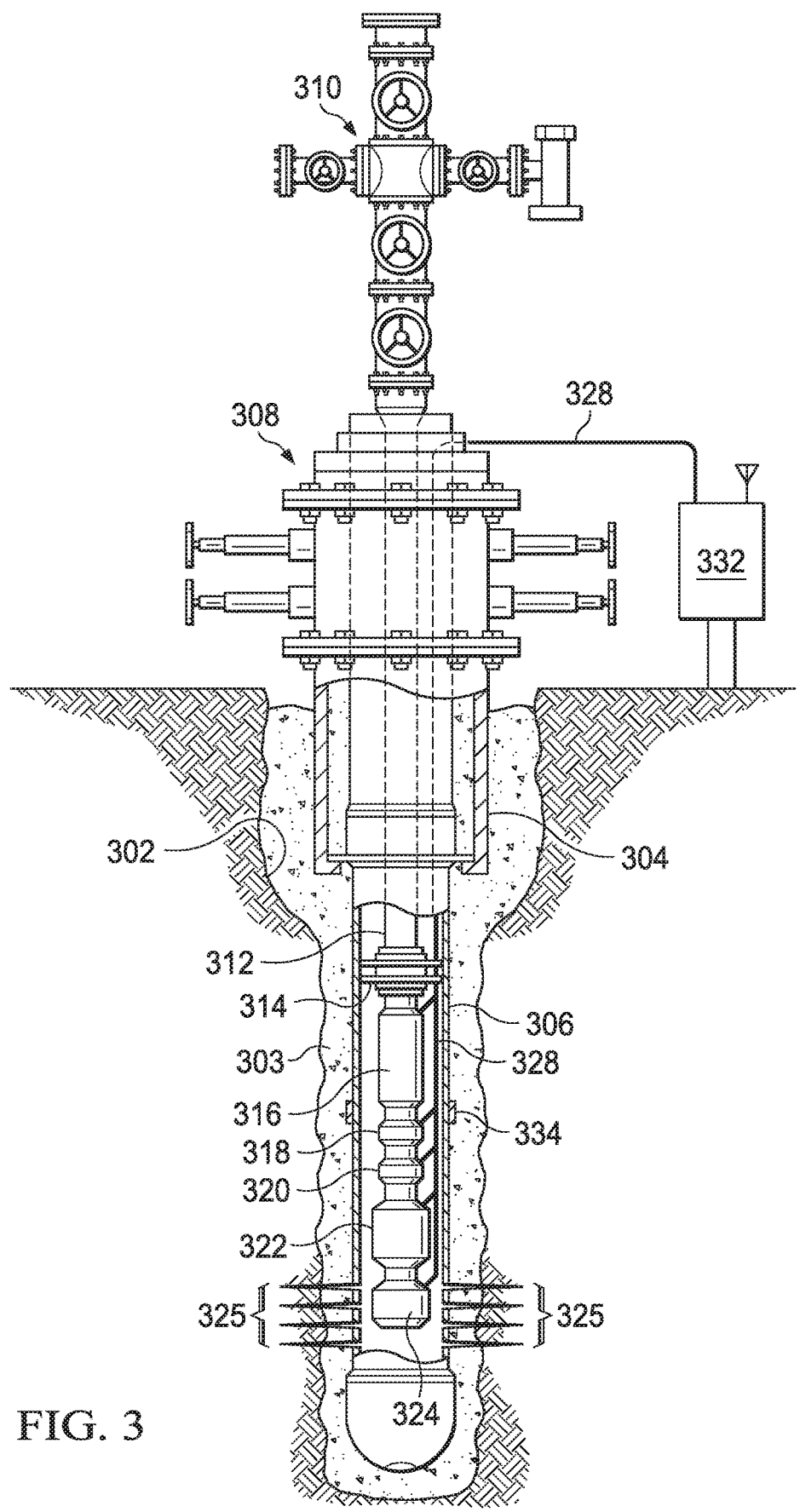
FIG. 3 is a schematic diagram of a production environment.

FIGS. 1-3 represent various subterranean environments within which the disclosed water flood monitoring techniques may be implemented. The disclosed monitoring techniques are not limited to implementation in the particular examples shown in FIGS. 1-3, however, and the scope of disclosure encompasses any and all subterranean environments in which water flood monitoring may be desirable.

FIG. 1 is a schematic diagram of an illustrative drilling environment. The drilling environment 100 comprises a drilling platform 102 that supports a derrick 104 having a traveling block 106 for raising and lowering a drill string 108. A top-drive motor 110 supports and turns the drill string 108 as it is lowered into a borehole 112. The drill string's rotation, alone or in combination with the operation of a downhole motor, drives the drill bit 114 to extend the borehole 112. The drill bit 114 is one component of a bottomhole assembly (BHA) 116 that may further include a rotary steering system (RSS) 118 and stabilizer 120 (or some other form of steering assembly) along with drill collars and logging instruments. A pump 122 circulates drilling fluid through a feed pipe to the top drive 110, downhole through the interior of drill string 108, through orifices in the drill bit 114, back to the surface via an annulus around the drill string 108, and into a retention pit 124. The drilling fluid transports formation samples—i.e., drill cuttings—from the borehole 112 into the retention pit 124 and aids in maintaining the integrity of the borehole. Formation samples may be extracted from the drilling fluid at any suitable time and location, such as from the retention pit 124. The formation samples may then be analyzed at a suitable surface-level laboratory or other facility (not specifically shown). While drilling, an upper portion of the borehole 112 may be stabilized with a casing string 113 while a lower portion of the borehole 112 remains open (uncased). Receivers used to implement the water flood monitoring techniques described herein may be mounted on such a casing string 113, as described below.

The drill collars in the BHA 116 are typically thick-walled steel pipe sections that provide weight and rigidity for the drilling process. The thick walls are also convenient sites for installing transmitters, receivers and logging instruments that measure downhole conditions, various drilling parameters, and characteristics of the formations penetrated by the borehole. The BHA 116 typically further includes a navigation tool having instruments for measuring tool orientation (e.g., multi-component magnetometers and accelerometers) and a control sub with a telemetry transmitter and receiver. The control sub coordinates the operation of the various logging instruments, steering mechanisms, and drilling motors in accordance with commands received from the surface, and it provides a stream of telemetry data to the surface as needed to communicate relevant measurements and status information. A corresponding telemetry receiver and transmitter is located on or near the drilling platform 102 to complete the telemetry link. One type of telemetry link is based on modulating the flow of drilling fluid to create pressure pulses that propagate along the drill string ("mud-pulse telemetry or MPT"), but other known telemetry techniques are suitable, such as electromagnetic and acoustic telemetry. At least some of the data obtained by the control sub may be stored in memory for later retrieval, e.g., when the BHA 116 physically returns to the surface.

A surface interface 126 serves as a hub for communicating via the telemetry link and for communicating with the various sensors and control mechanisms on the platform 102. A data processing unit (shown in FIG. 1 as a tablet computer 128) communicates with the surface interface 126 via a wired or wireless link 130, collecting and processing measurement data to generate logs and other visual representations of the acquired data and the derived models to facilitate analysis by a user. The data processing unit may take many suitable forms, including one or more of: an embedded processor, a desktop computer, a laptop computer, a central processing facility, and a virtual computer in the cloud. In each case, software on a non-transitory information storage medium may configure the processing unit to carry out the desired processing, modeling, and display generation. The data processing unit may also contain storage to store, e.g., data received from tools in the BHA 116 via electromagnetic or acoustic telemetry or any other suitable communication technique. The scope of disclosure is not limited to these particular examples of data processing units.

FIG. 2 is a schematic diagram of an illustrative wireline environment. More specifically, FIG. 2 illustrates a logging system 200 in accordance with at least some embodiments. Logging system 200 comprises a wireline logging tool 202 disposed within a borehole 204 proximate to a formation 208 of interest. The borehole 204 contains a casing string 220 and casing fluid 206, which may comprise one or more of oil, gas, fresh water, saline water, or other substances. Receivers used to implement the water flood monitoring techniques described herein may be mounted on such a casing string 220, as described below. The tool 202 comprises a sonde 210 within which various subsystems of the tool 202 reside. These subsystems are equipped to measure various parameters associated with the formation and wellbore. In the illustrative case of FIG. 2 the sonde 210 is suspended within the borehole 204 by a cable 212. Cable 212, in some embodiments a multi-conductor armored cable, not only provides support for the sonde 210, but also in these embodiments communicatively couples the tool 202 to a surface telemetry module 214 and a surface computer 216. The tool 202 may be raised and lowered within the borehole 204 by way of the cable 212, and the depth of the tool 202 within the borehole 204 may be determined by depth measurement system 218 (illustrated as a depth wheel). The casing string 220 may be composed of multiple segments of casing that are joined using casing collars, such as collar 222. In some embodiments, tools (e.g., electrodes, logging equipment, and communication equipment including fiber optics and transmitters and/or receivers) may be included within, coupled to or adjacent to the casing string 220 and/or the collar 222. For example, FIG. 2 includes a transceiver 224 that functions as a transmitter, receiver or both and communicates with other transmitters or receivers in other parts of the borehole 204, within the sonde 210 or at the surface.

FIG. 3 is a schematic diagram of a producing well with a borehole 302 that has been drilled into the earth. Such boreholes, examples of which are described above with respect to FIGS. 1 and 2, are routinely drilled to ten thousand feet or more in depth and can be steered horizontally for twice that distance. The producing well includes a casing header 304 and casing 306, both secured into place by cement 303. Blowout preventer (BOP) 308 couples to casing header 306 and production wellhead 310, which together seal in the well head and enable fluids to be extracted from the well in a safe and controlled manner.

The use of measurement devices permanently installed in the well facilitates monitoring of the well and/or the surrounding formation. The different transducers send signals to the surface that may be stored, evaluated and used to monitor the well's operations. Such signals may be transmitted using, e.g., a transmitter 334 that couples to or is disposed within the casing 306 or a collar of the casing 306. Such a transmitter may communicate with a receiver in any part of the system shown in FIG. 3, such as a receiver disposed in another part of the casing 306, within a different casing collar, within the well, or at the surface. Receivers used to implement the water flood monitoring techniques described herein may be mounted on such a casing 306 or casing collar, as described below. Near-wellbore measurements are periodically taken at the producing well and combined with measurements from other wells within a reservoir, enabling the overall state of the reservoir to be monitored, simulated and assessed. These measurements may be taken using a number of different downhole and surface instruments, including, but not limited to, temperature and pressure sensor 318 and flow meter 320. Additional devices also coupled in-line along production tubing 312 include downhole choke 316 (used to vary the fluid flow restriction), electric submersible pump (ESP) 322 (which draws in fluid flowing from perforations 325 outside ESP 322 and production tubing 312), ESP motor 324 (driving ESP 322), and packer 314 (isolating the production zone below the packer from the rest of the well). Additional surface measurement devices may be used to measure, for example, the tubing head pressure and the electrical power consumption of ESP motor 324. Although the example of FIG. 3 shows a well that incorporates an ESP, the disclosed systems and methods may also be used with wells that incorporate other systems for assisting with the extraction of fluids (e.g., gas lift systems), or with wells without such assist systems that rely on the pressure already present in the formation and/or induced by the injector wells.

Each of the devices along production tubing 312 couples to cable 328, which is attached to the exterior of production tubing 312 and is run to the surface through blowout preventer 308 where it couples to control panel 332. Cable 328 provides power to the devices to which it couples, and further provides signal paths (electrical, optical, etc.,) that enable control signals to be directed from the surface to the downhole devices, and for telemetry signals to be received at the surface from the downhole devices. The devices may be controlled and monitored locally by field personnel using a user interface built into control panel 332, or they may be controlled and monitored by a computer system (not specifically shown). Communication between control panel 332 and such a computer system may be via a wireless network (e.g., a cellular network), via a cabled network (e.g., a cabled connection to the Internet), or a combination of wireless and cabled networks.

Figure 4A:
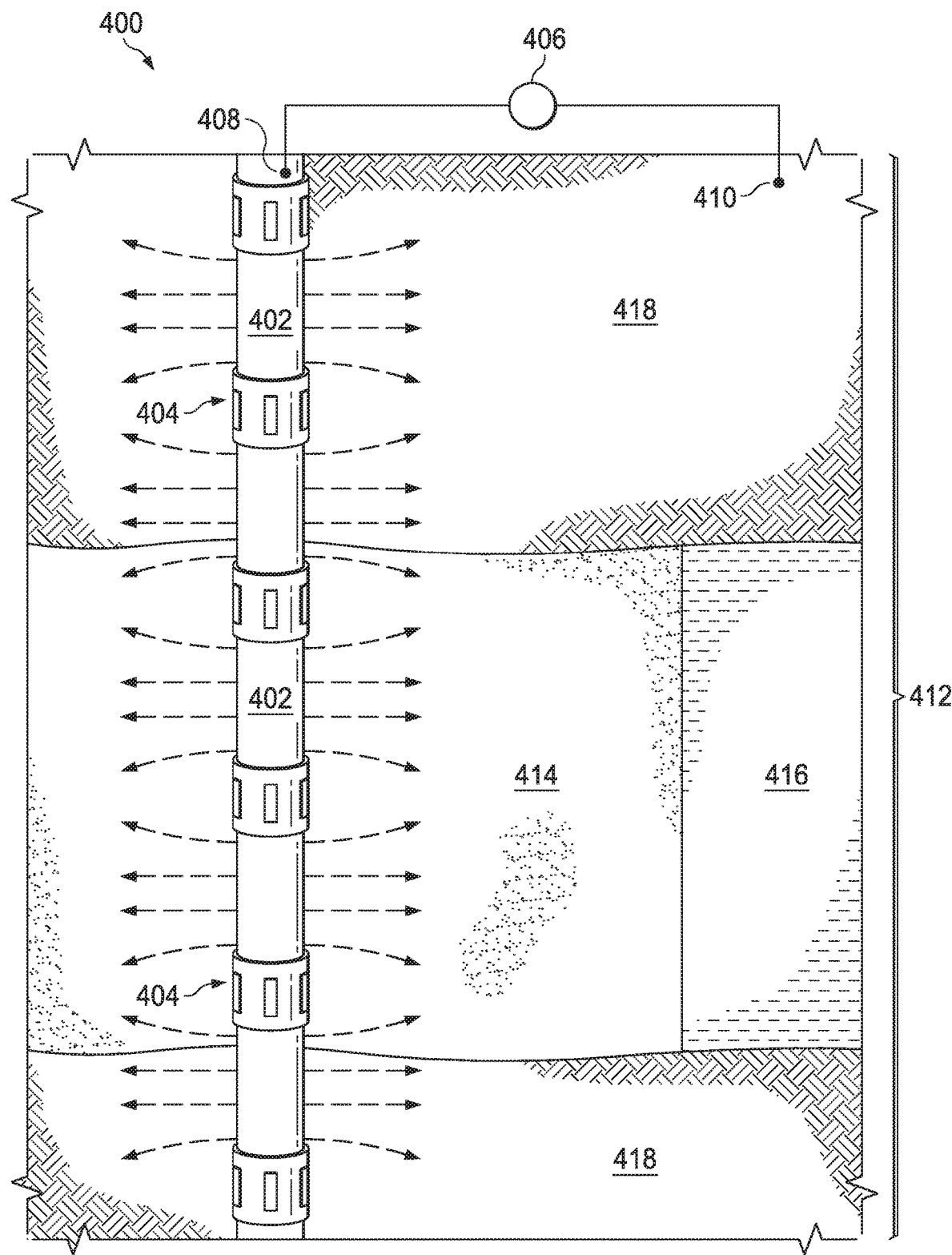
FIG. 4A is a schematic diagram representing water flood monitoring embodiments in which current is injected via a casing.

FIG. 4A is a schematic diagram representing water flood monitoring embodiments in which current is injected into the formation via a casing. More specifically, FIG. 4A shows an environment 400 that includes a conductive casing 402 and receivers 404 mounted on the casing 402. The casing 402 is excited by a current source 406 using an excitation electrode 408 and a return electrode 410 that is positioned any suitable distance (e.g., 100 meters) away from the excitation electrode 408. The portion of the casing 402 depicted in FIG. 4A may be any suitable part of the casing—e.g., close to the well head, in a vertical portion of the well, in a horizontal portion of the well, in a build section of the well, or any combination thereof. The casing 402 is disposed in a formation 412, which includes a reservoir 414, a water flood 416 in proximity to the casing 402, and shoulder beds 418. As the arrows emanating from the casing 402 indicate, current that is injected into the casing 402 by the excitation electrode 408 flows into the formation 412. The precise position of the excitation electrode 408 may be adjusted as desired to achieve the desired current distribution profile along the length of the casing 402. In some embodiments, both the excitation electrode 408 and the return electrode 410 may be positioned on the casing 402, with the return electrode 410 closer to the surface than the excitation electrode 408. In this manner, greater current magnitudes may be achieved toward the downhole end of the casing 402. Other electrode arrangements are contemplated and fall within the scope of this disclosure. Once injected, current flows through the formation 412. Although the resistivity of the formation 412 surrounding the casing 402 is generally uniform (particularly at any given depth), increasing proximity to a water flood will alter the resistivity in the formation 412. Potentials between the casing 402 and electrodes positioned on the receiver 404 reflect these resistivity changes and can be used to determine water flood location, as described below.

Figure 4B:
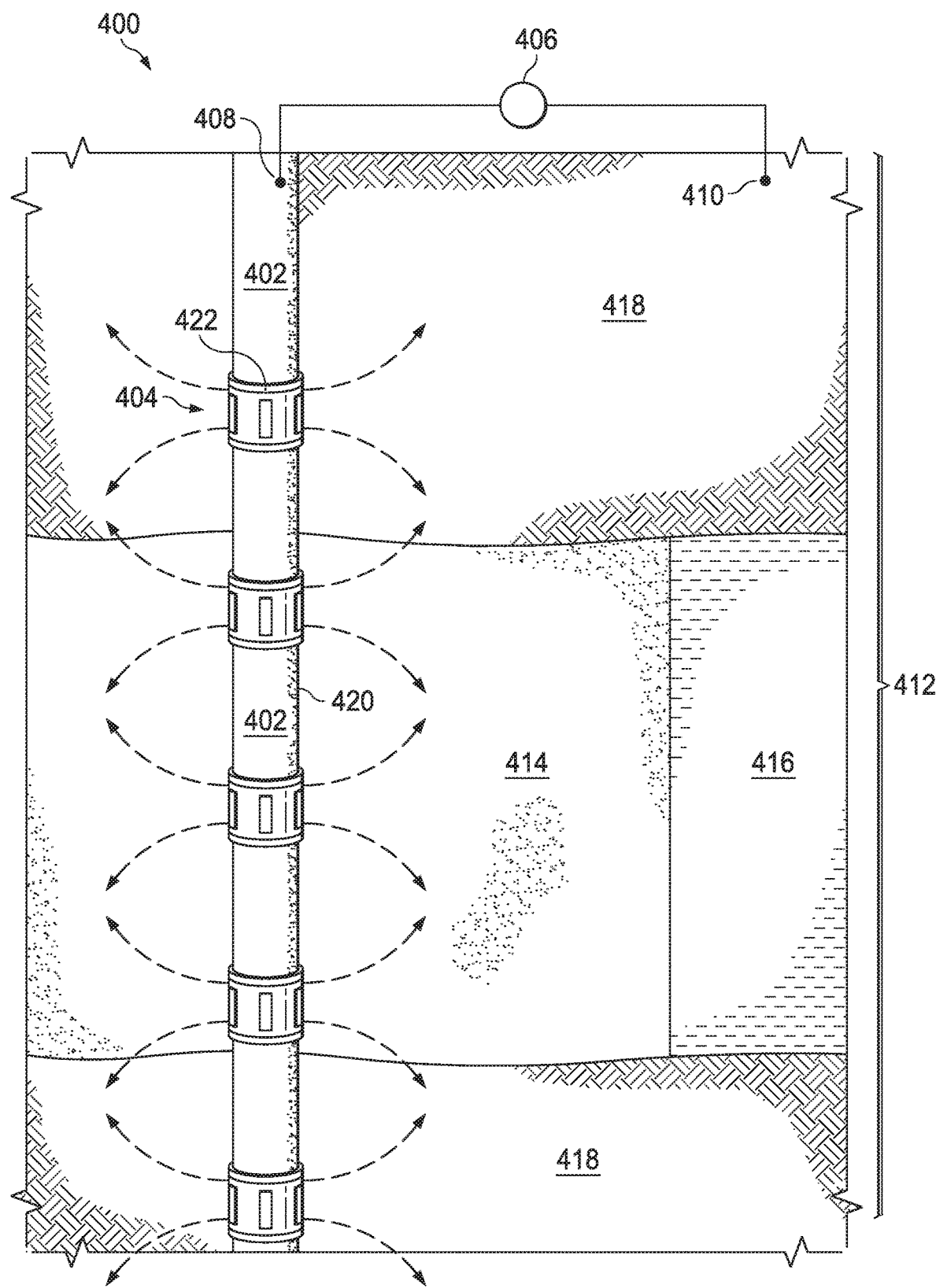
FIG. 4B is a schematic diagram representing water flood monitoring embodiments in which current is injected via casing collars.
Figure 5A:
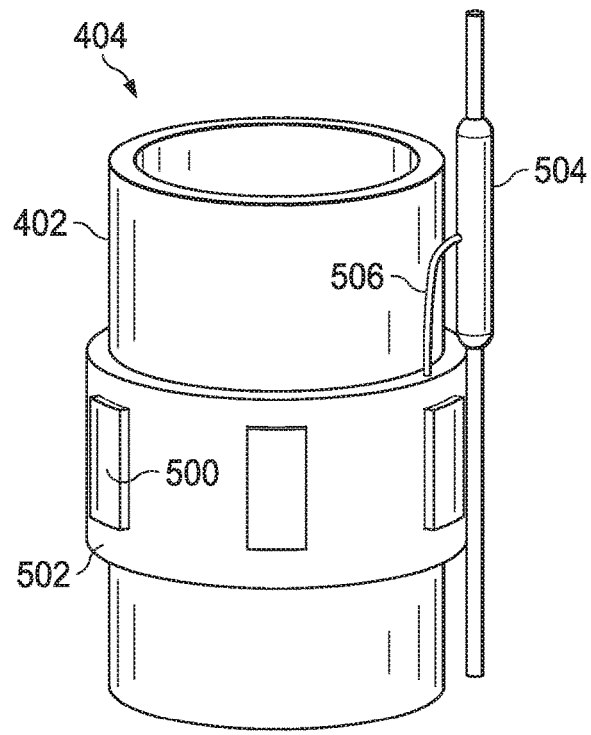
FIG. 5A is a perspective view of a receiver disposed on a casing and a fiber optic sensor associated with the receiver.
Figure 7:
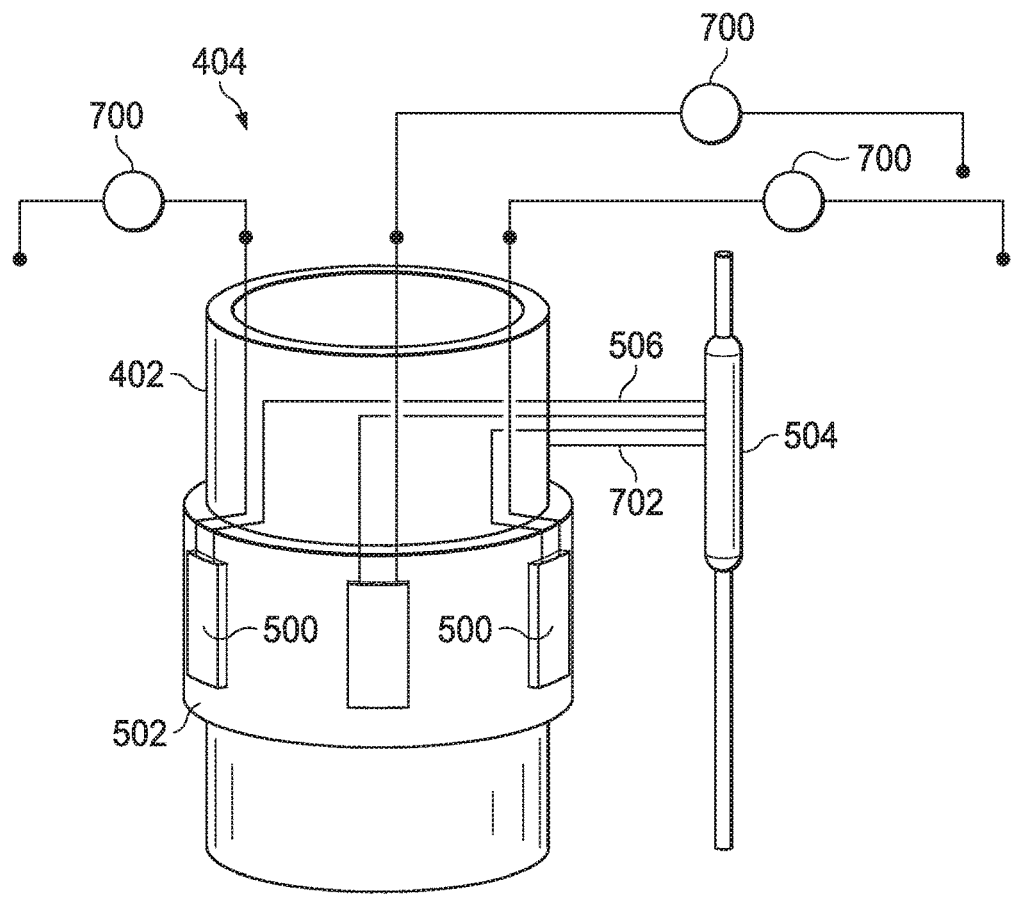
FIG. 7 is a perspective view of an alternative receiver disposed on a casing and a fiber optic sensor associated with the receiver.

FIG. 4B is a schematic diagram representing water flood monitoring embodiments in which current is injected via casing collars. The environment 400 shown in FIG. 4B is substantially similar to that shown in FIG. 4A, with the exception of the points along the casing 402 through which current is injected into the formation 412. In particular, a suitable insulative material 420 (e.g., ceramic, fiberglass or epoxy resin, or insulating paint) is disposed on portions of the casing 402 to permit current to be injected into the formation 412 at predetermined locations on the casing 402. In the embodiments depicted in FIG. 4B, for example, all of the casing 402 is insulated with the exception of casing collars 422 adjacent to the receivers 404. Thus, current is injected into the formation 412 solely through the casing collars 422. By injecting current into the formation 412 from predetermined portions of the casing 402, current is concentrated in the areas of interest where water flood is expected and available signal is maximized. The scope of the disclosure is not limited to injecting current through any particular portion(s) of the casing 402, and the insulative material 420 may be arranged on the casing 402 and/or casing collars 422 to implement any suitable current distribution scheme. For example, insulative collars may be positioned along the casing 402 to isolate the portion of the casing between the insulative collars, and an excitation electrode may then be coupled to any point on the casing, thereby focusing current within a targeted area. At least some of the illustrations described below, such as FIGS. 5A and 7, are depicted in context of the current distribution scheme shown in FIG. 4A. However, the various embodiments described below are not limited to use with any particular current distribution scheme, and they may be used with the scheme shown in FIG. 4A, FIG. 4B, or any other suitable scheme.

FIG. 5A is a perspective view of a receiver 404. The receiver 404 includes multiple galvanic or capacitive electrodes 500 arranged circumferentially about the casing 402. Any suitable number of electrodes 500 may be used in the receiver 404, and different receivers 404 mounted on a single casing may use different numbers of electrodes. The electrodes 500 in a receiver 404 may be arranged in any azimuthal direction(s), as desired. In at least some embodiments, a minimum of five electrodes 500 are used in a single receiver 404, and in at least some such embodiments, the five electrodes 500 are evenly spaced. The electrodes 500 may be of any suitable size and shape, but in at least some embodiments, the electrodes are rectangular and measure six inches long and two inches wide. In embodiments using insulative material on the casing 402 (such as those depicted in FIG. 4B), the length of the insulative material between any two receivers 404 is at least as great as the smallest width or length dimension among all electrodes 500 on those two receivers 404. One or more insulative pads 502 (e.g., ceramic, fiberglass or epoxy resin) may be positioned between electrodes 500 and the underlying casing 402/casing collar 422, thus precluding direct electrical contact between the electrodes 500 and the casing 402/casing collar 422. In some embodiments, the insulative pad 502 has a thickness ranging from 0.05 inches to 0.5 inches, inclusive. The precise thickness of an insulative pad 502 depends at least in part on available annular space between the casing 402 and the borehole wall, as well as the maximum acceptable coupling (i.e., shorting) between the casing 402 and the electrodes 500.

In at least some embodiments that include multiple receivers mounted on a single casing 402, the receivers are spaced between 15 and 30 feet apart, inclusive. Receivers may be pre-fabricated in the form of circular or C-shaped collars that are clamped or otherwise coupled to the casing 402 prior to deployment downhole. The receiver 404 couples to a fiber optic sensor 504 that contains a plurality of electro-mechanical (e.g., piezoelectric) transducers that convert potentials from the electrodes 500 into optical signals that are provided to a computer (e.g., downhole or at the surface) for processing. More specifically, as potentials are applied to an electro-mechanical transducer, the transducer deforms, thus inducing strain in the optical fiber bonded to that transducer. This strain in the optical fiber can be interrogated at the surface using well-known fiber optic multiplexing and interrogation techniques. The strain is proportional to the applied potential. Similarly, optical signals from different receivers may be differentiated at the surface using known fiber optic multiplexing and interrogation techniques. In some embodiments, the components outside of the casing 402—including the electrodes 500, the insulative pad 502, the sensor 504, and the connection wires 506—are disposed in a cement sheath adjacent to the casing 402. The various receiver properties and parameters described above (including electrode and insulative pad parameters) are not limited to application in the embodiments depicted in FIG. 5A. On the contrary, they may apply to any of the receiver embodiments described in this disclosure.

Figure 5B:
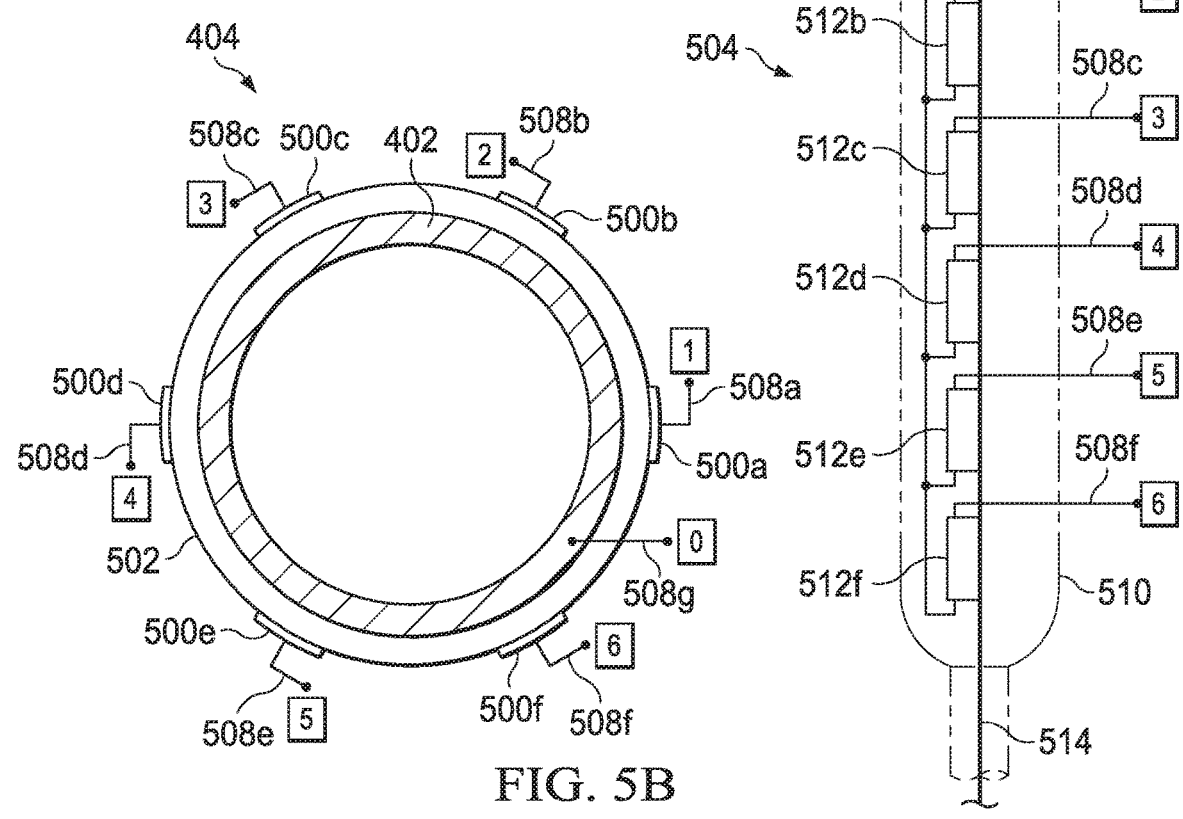
FIG. 5B is a cross-sectional view of a casing-mounted receiver and includes a schematic diagram of transducers disposed within a fiber optic sensor and coupled to the receiver according to a first arrangement.

FIG. 5B includes a top-down, cross-sectional view of a receiver 404. The receiver 404 includes insulative pad 502 disposed about the circumference of the casing 402. Six electrodes 500a-500f are positioned on the insulative pad 502 and are evenly spaced from each other. Each of the electrodes 500a-500f couples to a connection wire 508a-508f. A connection wire 508g couples to the casing 402.

FIG. 5B also includes a schematic diagram of the contents of a fiber optic sensor 504, and it depicts the manner in which the connection wires 508a-508g couple to the transducers housed within the sensor 504. The fiber optic sensor 504 includes a package 510 (e.g., made of insulative material, such as ceramic or epoxy resin) that houses transducers 512a-512f. Each of the transducers couples to the connection wire 508g, which, in turn, couples to the casing 402. Each of the transducers also couples to a different one of the connection wires 508a-508g, which, as explained, couple to different electrodes 500. Thus, for example, transducer 512a couples to the casing 402 and electrode 500a; transducer 512b couples to the casing 402 and the electrode 500b; transducer 512c couples to the casing 402 and electrode 500c, and so forth. The transducers 512a-512f couple to fiber optic cable 514. Each of the transducers 512a-512f is deformed by the differential signals applied to it by the connection wires to which it couples, thus modifying the optical signal passing through that transducer. These optical signals are carried through the fiber optic cable 514 to suitable processing logic, such as a downhole or surface computer, for analysis. The processing logic is capable of differentiating and interpreting the various transducers' signals using well-known fiber optic multiplexing and interrogation techniques. The detailed operation of the transducers 512a-512f, the fiber optic signals, and the signal multiplexing performed at a downhole or surface computer will be known to those of ordinary skill in the art.

Operation is now described with regard to FIGS. 4A-5B. The current source 406 injects current into the casing 402 via the excitation electrode 408. Current flows down the casing 402 and is injected into the formation 412 through portions of the casing 402 that are not insulated. Electrodes 500a-500f provide potentials to corresponding transducers 512a-512f through connection wires 508a-508f, with each of the transducers 512a-512f coupling to a different electrode. The potential present at the casing 402 is provided to each of the transducers 512a-512f, essentially making the casing 402 a "reference" point with respect to which the potential at each of the electrodes is measured. The transducers 512a-512f modify the optical signals passing through them in accordance with the potentials between the casing 402 and each of the electrodes 500a-500f. The optical signals are then provided to a computer for processing as described further below.

Figure 6:
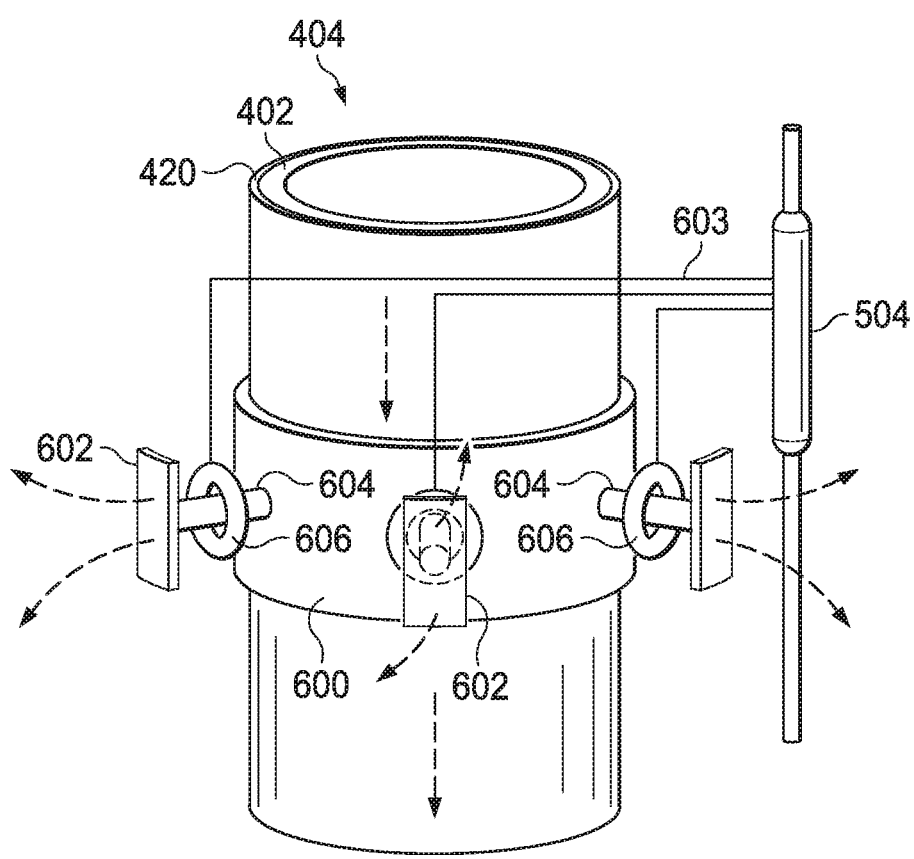
FIG. 6 is a perspective view of a toroidal receiver disposed on a casing and a fiber optic sensor associated with the receiver.

FIG. 6 is a perspective view of a toroidal receiver 404 disposed on a casing 402 and including a fiber optic sensor 504. In such embodiments, the receiver 404 includes multiple electrodes 602 that couple to a casing collar 600 (or, in some embodiments, another part of the casing 402) using conductive arms 604. In at least some embodiments, the electrodes 602 are generally the same or similar to the electrodes 500 in terms of shape and size. The conductive arms 604 may be of any suitable shape, but in at least some embodiments, the arms are cylindrical. The lengths of the conductive arms 604 may be varied as desired, but in at least some embodiments, the lengths range between 0.5 inches and 12 inches, inclusive. The diameters of the arms 604 may be varied as desired, but in at least some embodiments, the diameters range between 0.25 inches and 3 inches, inclusive. Disposed on each of the conductive arms 604 is a dual-terminal toroid 606. The terminals of the toroid 606 couple to the fiber optic sensor 504 via connective wires 603. In at least some embodiments, an insulative layer 420 is applied to one or more of the casing 402, the casing collar 600, and the conductive arms 604. In some embodiments, the conductive arms 604 and toroids 606 are housed within an insulative package (not specifically illustrated) to protect the arms and toroids from damage during deployment downhole.

Still referring to FIG. 6, in operation, current is applied to the casing using an excitation electrode. In at least some embodiments, the current is an alternating current having a frequency in the 1 kHz to 100 kHz range, inclusive. The insulative layer 420 prevents current leakage into the formation within which the casing 402 is positioned, and, more particularly, steers the current to the electrodes 602, which are not insulated. As a result, current is injected into the formation via the electrodes 602. Resistivity changes in the formation caused by water floods affect the amount of current flowing through the electrodes 602 (and the electrodes' conductive arms 604). Current flow through electrodes 602 located closer to the water flood (i.e., oriented closer to the azimuthal direction of the water flood) will be impacted to a greater degree than will current flow through electrodes 602 located farther away from the water flood (i.e., oriented farther away from the azimuthal direction of the water flood). Thus, measurement of the degree of current flow through the electrodes 602 provides information about the water flood location. Accordingly, the toroids 606 are used to monitor current flow through the conductive arms 604 (which is identical or nearly identical to current flow through the corresponding electrodes 602). The potential across each toroid's terminals varies based on the current flow through the conductive arm 604 to which that toroid couples. Thus, potentials across the toroids' terminals can be used to determine water flood location. The measurements are processed as described below.

FIG. 7 is a perspective view of alternative embodiments of the receiver 404.

Specifically, the receiver 404 includes electrodes 500 that are disposed on the casing 402 with the insulative pad 502 positioned between the electrodes and the casing, as shown in FIG. 5A, for example. The electrodes 500 couple to the fiber optic sensor 504 via connection wires 506. Unlike the embodiments described above, however, the electrodes 500 in the embodiments depicted in FIG. 7 couple directly to one or more current sources 700. The current source(s) 700 inject current into the formation within which the casing 402 is disposed via the electrodes 500. Thus, in such embodiments, the casing 402 is not excited for purposes of the water flood location identification techniques described herein. In some such embodiments, a single current source 700 couples to all of the electrodes 500, while in other such embodiments, a single current source 700 couples to one or more electrodes 500 but fewer than all electrodes 500. In some such embodiments, multiple current sources 700 may couple to a single electrode 500. In some embodiments, a single current source is successively coupled to the various electrodes 500. Any suitable number and configuration of current sources may be used, but in preferred embodiments, the currents injected through the electrodes 500 are equal. Once current is injected into the formation via the electrodes 500, the potentials at the electrodes 500 are measured with respect to the casing 402 using the connection wires 506, transducers housed within the fiber optic sensor 504, and a wire 702 that couples the casing 402 to each of the transducers within the sensor 504. The specific electrode-to-transducer coupling scheme used may be selected from any of the schemes described above, or a different coupling scheme may be used.

The description of FIGS. 4A-7 provided above explains the various techniques by which potentials may be measured in accordance with embodiments. The measurements are provided via fiber optic cables to computers located either downhole or at the surface (hereinafter referred to as "the computer" for brevity), examples of which are provided in FIGS. 1-3 (e.g., surface computer 216 in FIG. 2). There, the various signals from the different transducers associated with the different receivers are differentiated using well-known multiplexing and interrogation techniques. FIGS. 8-12E and the remainder of this description explain how the differentiated measurements are subsequently processed and used to identify water flood locations.

Figure 8:
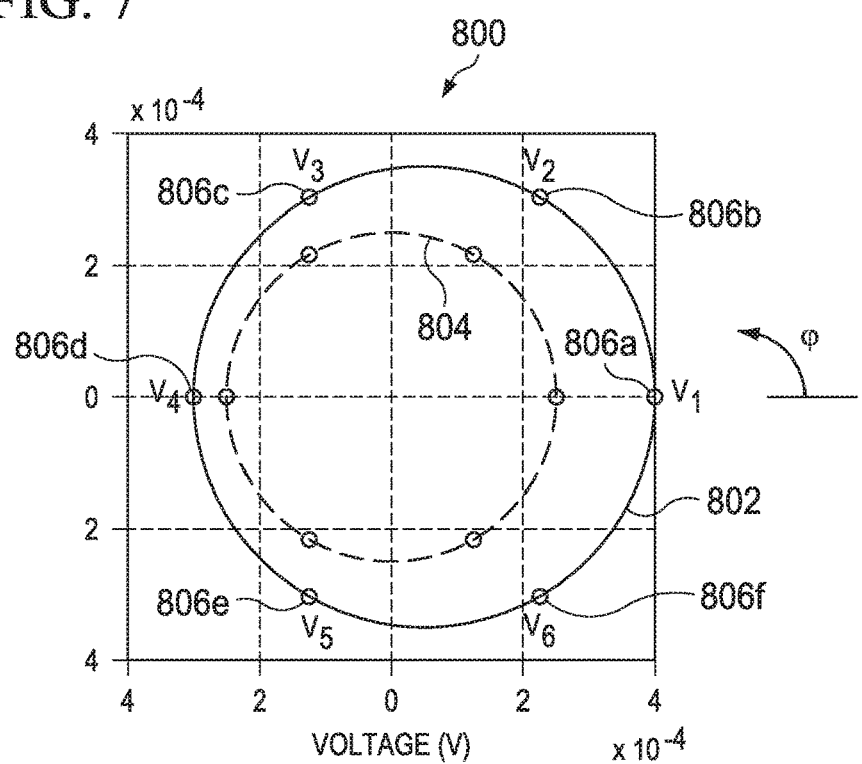
FIG. 8 is a polar plot of potentials measured using casing-mounted receivers.

FIG. 8 is a polar plot 800 of potentials measured using a casing-mounted receiver at a single depth. The plot 800 is based on a variable angle $\phi$, which indicates the azimuthal orientation at which a particular potential is measured. The polar plot may be auto-generated by the computer or manually generated by a user. The plot 800 includes curves 802 and 804. Curve 802 is generated using the potentials received from the fiber optic sensor 504 in case of a flood. Curve 804 is a baseline "no flood" curve against which the curve 802 is compared to determine the presence and position of a water flood. As shown, the curve 802 includes data points 806a-806f. Data point 806a, for instance, is obtained from an electrode (or toroid) having an azimuthal orientation of $\phi=0$ degrees, while data point 806d is obtained from an electrode (or toroid) having an azimuthal orientation of $\phi=180$ degrees. In this way, each of these data points is a potential associated with a different electrode (or toroid). Referring to FIG. 5B, for example, the data points 806a-806f may correspond to potentials obtained from electrodes 500a-500f, respectively. The plot 800 is representative of potentials for a single receiver 404 at a single depth. Separate plots may be generated for each receiver in the case that multiple receivers are used on a single casing—for example, as shown in FIGS. 4A-4B.

Still referring to FIG. 8, the scaled potential from each electrode is plotted as part of curve 802. In a "no flood" situation, the curve 802 will be substantially identical between receivers at differing depths. However, the introduction of a flood alters the formation resistivity, and this effect is more pronounced with increasing proximity to the flood. The potentials measured at the electrodes begin to change as a result of the approaching water flood. The potential associated with the electrode closest to the flood will experience the greatest rise, and the potential associated with the electrode farthest from the flood will experience the least rise. For example, curve 802 in FIG. 8 is asymmetrical (or "deformed"), whereas the "no flood" curve 804 is symmetrical. By comparing the curves 802, 804, it is apparent that the greatest deformation occurs at $\phi$ angle=0 degrees, which corresponds to an increase in the potential at data point 806a relative to the "no flood" curve 804. Data points 806b and 806f also experience increases in potential relative to curve 804. Data point 806d, by contrast, experiences a lesser degree of change relative to the curve 804. Thus, it may be concluded from the plot 800 that the water flood is located in the $\phi$ angle=0 degrees direction.

Polar plots, such as the plot shown in FIG. 8, may be generated as follows. First, the potentials measured at each of the azimuthally-arranged electrodes or toroids (hereinafter collectively referred to as "electrodes" for brevity) is normalized to remove the unknown current. One such normalization method includes measuring a baseline potential in the absence of a flood and computing scaling weights (i.e., normalization factors) using that measurement for each receiver as follows:

$$w_i = \frac{avg_i(v_i^{bl})}{v_i^{bl}}, i = 1, \ldots, N \tag{1}$$

where $V_i^{bl}$ is the i-th absolute baseline potential, and $avg_i(V_i^{bl})$ is the average over the N potential measurements. These weights are stored and used to mathematically scale subsequent measurements. In particular, $$\overline{V}_i = w_i \times V_i \tag{2}$$

where $\overline{V}_i$ is the i-th scaled absolute potential.

Continuous polar plots of the scaled measurements $\overline{V}(\phi)$ may then be obtained by interpolating the discrete measurements $\overline{V}_i$, resulting in a curve such as solid curve 802 in FIG. 8. The baseline (dashed) curve 804 is generated using the baseline (no flood) measurements described above. As explained, an approaching water flood deforms the scaled azimuthal measurements. This is due to the increased conductivity associated with water in comparison to reservoir fluids. Thus, the current in the formation is redistributed so that more current is drawn toward the more conductive water flood, resulting in an increase in the potentials at the receiver(s) aligned with the flood. Once the polar plot is generated, the largest value of $\overline{V}(\phi)$ is identified as the potential associated with the direction $\phi$ of the water flood, as explained above with respect to FIG. 8. The deformation of the scaled azimuthal measurement curve (e.g., curve 802 in FIG. 8) in comparison to the baseline circle (e.g., curve 804 in FIG. 8) may be quantified by a geometric factor GF:

$$GF = \frac{\max_\phi(\overline{V}(\phi)) - avg_\phi(\overline{V}(\phi))}{avg_\phi(\overline{V}(\phi))} \tag{3}$$

Once the geometric factor is calculated, it may be inverted using any suitable technique to determine the distance to flood. A parametric functional (or cost function) is formed from the linear combination of a misfit functional and a stabilizing functional. The misfit functional can be formed as the L2 norm of the weighted difference between observed and predicted data. The stabilizing functional can be formed as the L2 norm of the weighted model parameters, and may be inclusive of a priori models and spatial functions. The model parameters are adjusted to minimize the parametric functional. Numerical techniques to achieve this minimization may include deterministic methods (e.g., Gauss-Newton, Levenverg-Marquardt, Steepest Descent, Conjugate Gradients) or stochastic methods (e.g., Markov Chain Monte Carlo, Genetic Algorithms, Simulated Annealing). In addition to a final model, the inversion may generate inversion metrics such as misfit/error, data uncertainty estimates, and model uncertainty estimates. Inversion techniques may be performed using geometric factor or based on any algebraic function of measurements. It is also possible to use the time-lapse measurement (the difference of a differential or absolute voltage) to make a qualitative assessment of an approaching water flood. In this scenario, a water flood is detected when the time-lapse signal exceeds a certain threshold. In this case, the threshold may be selected based on the observed noise level of the time-lapse measurement when the water flood is far away. For instance, the threshold can be selected to be 2-5 times the maximum noise observed.

Figure 9:
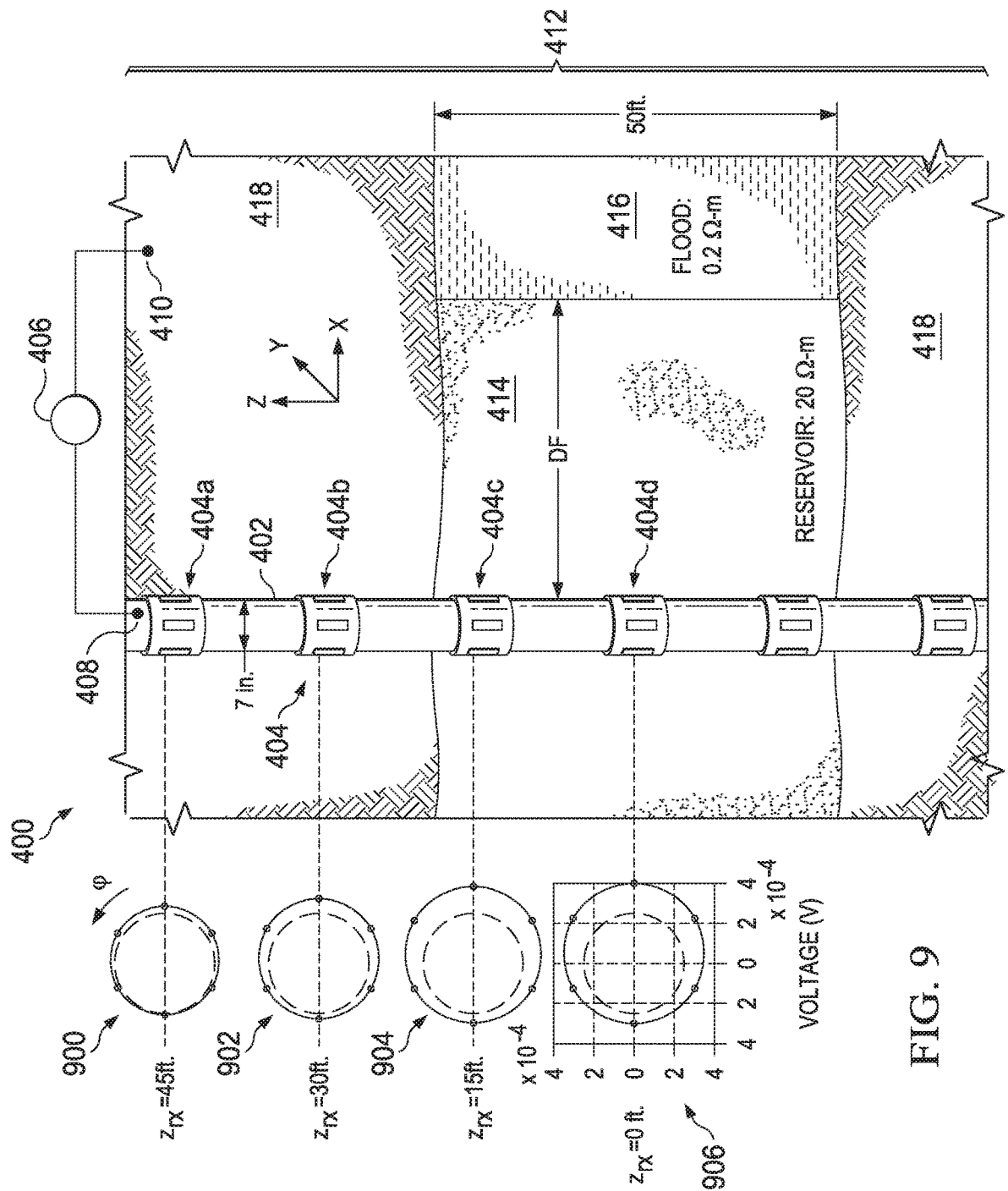
FIG. 9 is a schematic diagram representing water flood monitoring embodiments and corresponding potential polar plots.

The polar plot 800 provides only two-dimensional information with regard to the water flood location. A series of polar plots obtained using potentials from different receivers at different depths provides three-dimensional information regarding the location of the water flood relative to the casing. FIG. 9 is a schematic diagram of a well that includes multiple casing-mounted receivers at differing depths, as well as the potential polar plots associated with four of these receivers. In particular, the environment 400 of FIG. 9 includes multiple receivers 404a-404d mounted upon the casing 402 and spaced approximately 15 feet apart from each other. The current source 406 excites the casing 402 using the excitation electrode 408 and the return electrode 410. The well is disposed in the formation 412, which includes a reservoir 414 having an approximate resistivity of 20 Ohms-meter, the water flood 416 having an approximate resistivity of 0.2 Ohms-meter and an approximate depth of 50 feet, and the shoulder beds 418 having an approximate resistivity of 1 Ohm-meter. FIG. 9 also includes polar plots 900, 902, 904, 906, which are generated using potentials obtained from receivers 404a-404d, respectively. As shown, the solid curve in plot 900 is coincident with the "no flood" dashed-line curve, meaning that the receiver 404a does not detect the flood 416. The solid curves in plots 902, 904 and 906, however, have potentials at $\phi=0$ degrees that progressively enlarge at a greater rate than the potentials at other values for $\phi$. The plots in FIG. 9 indicate that not only is the flood 416 located in the $\phi=0$ degrees azimuthal direction, but that the flood 416 is closer to the receiver 404d than it is to the receiver 404a. Thus, receivers 404 at multiple depths may be used to obtain three-dimensional information regarding the water flood location.

Figure 10:
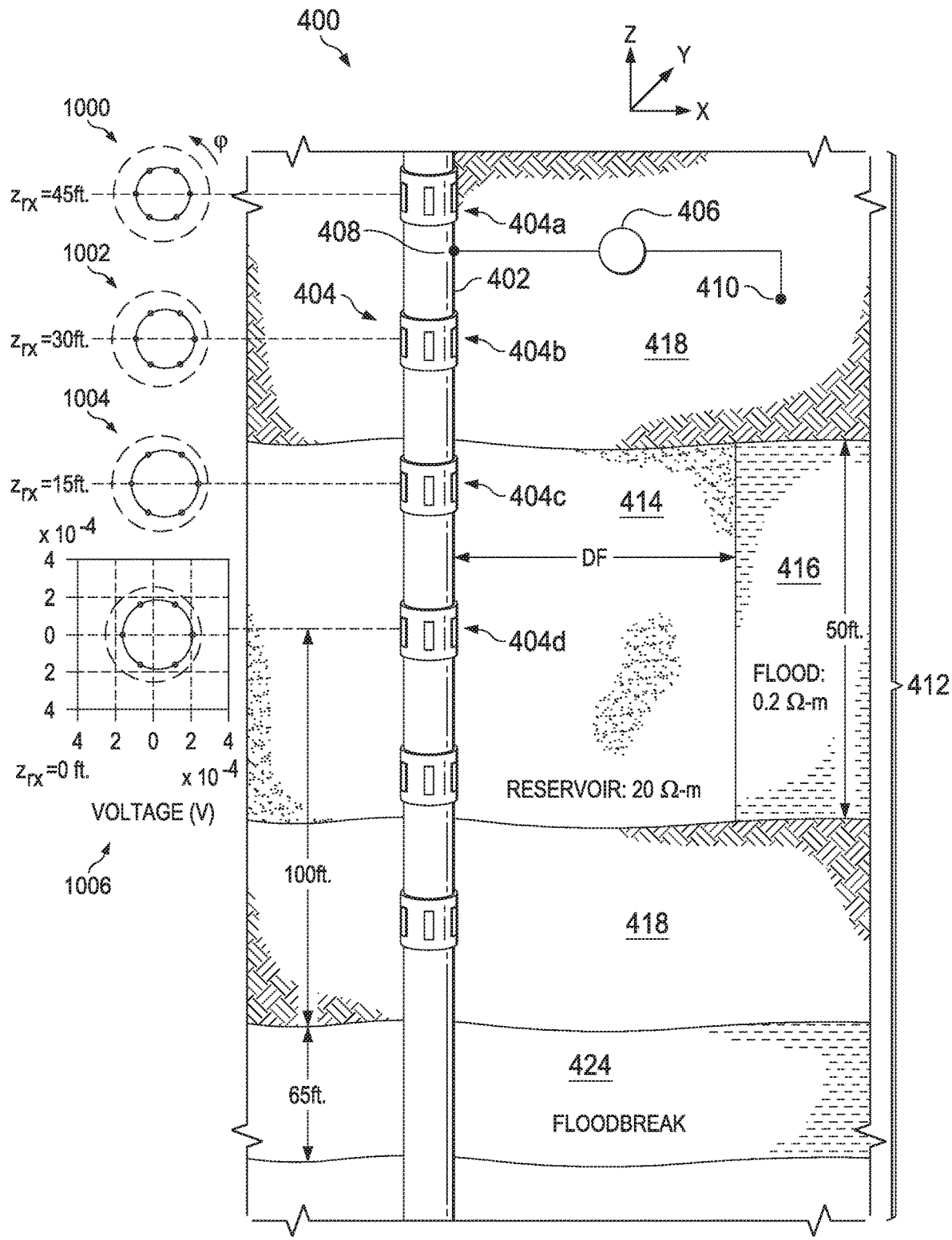
FIG. 10 is another schematic diagram representing water flood monitoring embodiments and corresponding potential polar plots.

FIG. 10 is a schematic diagram of a well that includes multiple casing-mounted receivers at differing depths, as well as the potential polar plots associated with four of the receivers. FIG. 10 is similar to FIG. 9, but the two figures differ in that the environment 400 of FIG. 10 includes a flood break through 424 below the lower shoulder bed 418, resulting in polar plots 1000, 1002, 1004, 1006 that differ from the polar plots of FIG. 9. Specifically, because the flood break through 424 is in contact with the casing 402, a substantial portion of the current flowing through the casing 402 leaks into the flood break through region. As a result, the signal strength shown in the polar plots is significantly attenuated in comparison to the polar plot signal strengths shown in FIG. 9, which contains no flood break through. The behavior of the solid curve in the polar plots of FIG. 10 relative to the dashed baseline curve, however, is still similar to the behavior of the solid curve in the polar plots of FIG. 9—that is, the flood is located in the azimuthal direction $\phi=0$.

Still referring to FIGS. 9 and 10, the change in the absolute signal strength due to the flood outbreak 424 makes estimation of the distance to flood using absolute potentials a complex task. The geometric factor, however, is substantially insensitive to changes in the absolute signal strength and can be used reliably to determine distance to flood.

FIG. 11 is a geometric factor distribution graph 1100 for the environments 400 shown in FIGS. 9 and 10. The graph 1100 plots geometric factor curves 1102a-1102e, 1104a-1104e for the receivers in FIGS. 9 and 10, respectively. The different curves 1102a-1102e represent different distances to flood, as indicated, and the different curves 1104a-1104e also represent different distances to flood, as indicated. As the curves demonstrate, the geometric factor is virtually unchanged between the environments 400 shown in FIGS. 9 and 10.

Figure 12A:
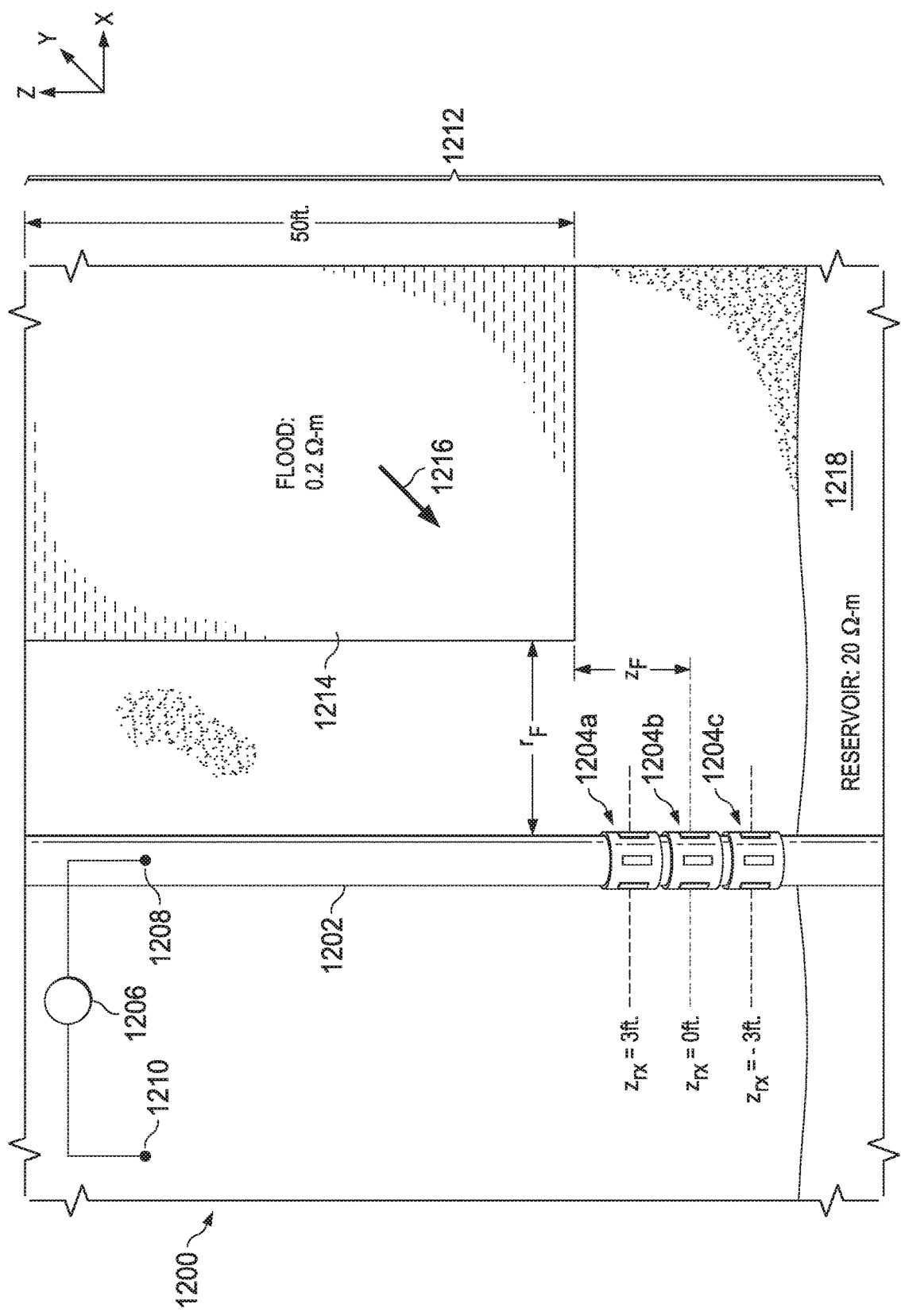
FIGS. 12A-12C are schematic diagrams representing array-based water flood monitoring embodiments.
Figure 12B:
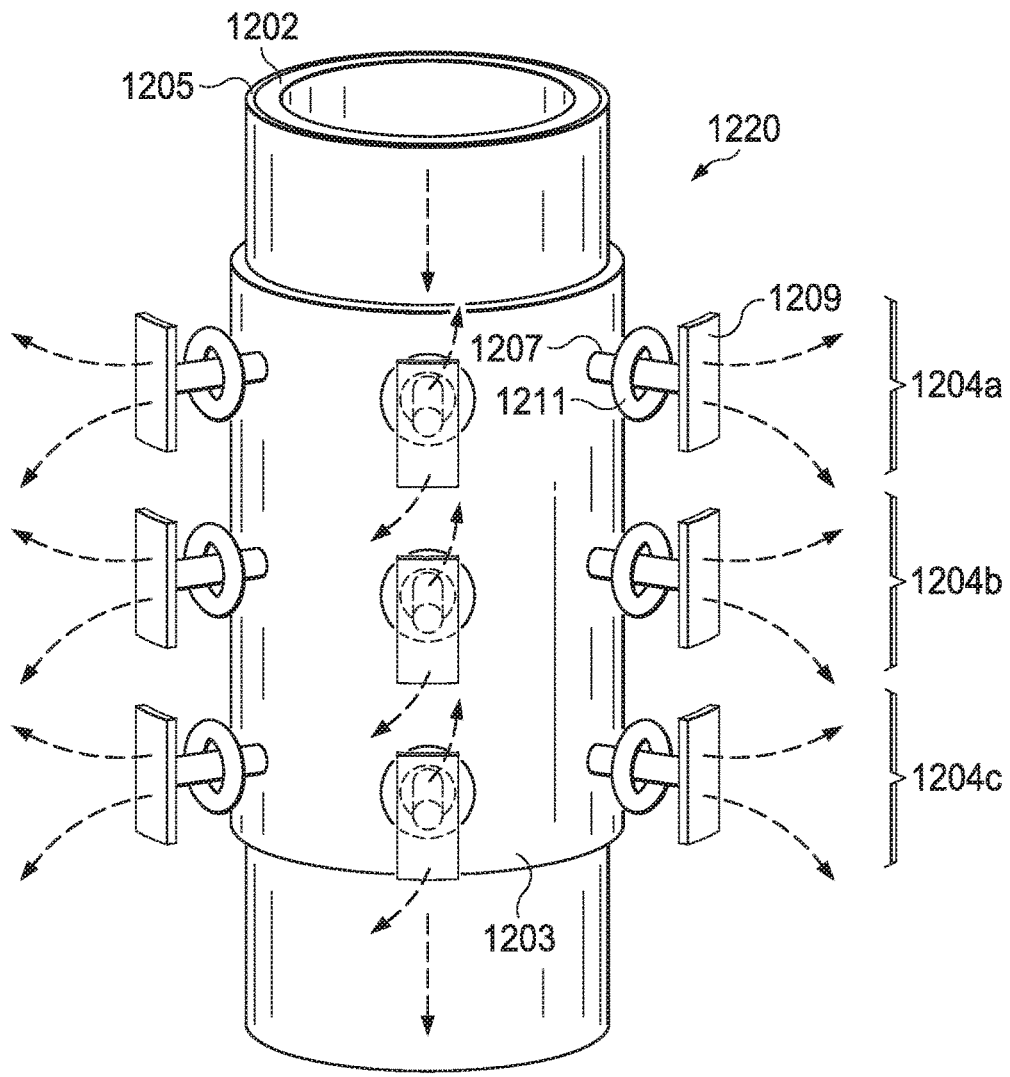
Figure 12C:

FIGS. 12A-12C are schematic diagrams representing array-based water flood monitoring embodiments. Array-based embodiments include receivers that are positioned closely together (e.g., each receiver is positioned within 5 feet of the next receiver), so that the electrodes on the receivers, when visualized in a two-dimensional format, form an array. Potentials from horizontally coplanar electrodes are processed to determine the azimuth of the flood $\phi_0$, whereas potentials from vertically coplanar electrodes are processed to determine the elevation of the flood $\theta_0$. The geometric factors of both horizontal and vertical potentials may be jointly inverted as explained above using any suitable inversion technique to obtain the radial and axial distances to flood. Array-based embodiments are thus useful for determining the precise location of a water flood.

The environment 1200 in FIG. 12A includes a casing 1202 having receivers 1204a-1204c mounted thereupon, with an inter-receiver spacing of approximately three feet. A current source 1206 excites the casing 1202 using an excitation electrode 1208 and a return electrode 1210. The casing 1202 is disposed in a formation 1212. A water flood 1214 approaches the receivers 1204a-1204c in the direction indicated by the arrow 1216. The water flood 1214 has a resistivity of approximately 0.2 Ohms-meter. A reservoir 1218 having a resistivity of 20 Ohms-meter is situated below the receivers 1204a-1204c. The system 1220 in FIG. 12B has a toroidal configuration similar to that shown in FIG. 6. The system 1220 includes a casing 1202, an insulative coating 1205 disposed on one or more of the casing 1202, a casing collar 1203, and conductive arms 1207 that couple the casing 1202 or casing collar 1203 to the electrodes 1209. Toroids 1211 couple to the conductive arms 1207 and, as explained with reference to FIG. 6, determine potentials based on the flow of current passing through the conductive arms 1207. The electrodes 1209 positioned at the highest depth belong to receiver 1204a; the electrodes 1209 at the lowest depth belong to receiver 1204c; and the electrodes in between the highest and lowest depth are part of receiver 1204b. The operation of the receivers shown in FIGS. 12A and 12B is similar to that of the receivers already described above.

FIG. 12C is an array map 1250 that shows the configuration of the receivers 1204a-1204c from FIGS. 12A and 12B in a two-dimensional format. At an azimuthal orientation of $\phi=0$ degrees, potentials $V_{11}$, $V_{12}$ and $V_{13}$ are obtained from receivers 1204c, 1204b and 1204a, respectively; at an azimuthal orientation of $\phi=60$ degrees, potentials $V_{21}$, $V_{22}$ and $V_{23}$ are obtained from receivers 1204c, 1204b and

1204a, respectively; and so forth. Potentials from horizontally coplanar electrodes (e.g., $V_{11}, V_{21}, V_{31}, V_{41}, V_{51}, V_{61}$) are processed as described above to determine the azimuth of the flood $\phi_0$, while potentials from vertically coplanar electrodes (e.g., $V_{11}, V_{12}, V_{13}, V_{41}, V_{42}, V_{43}$) are processed as described above to determine the elevation of the flood $\theta_0$.

Figure 12D:
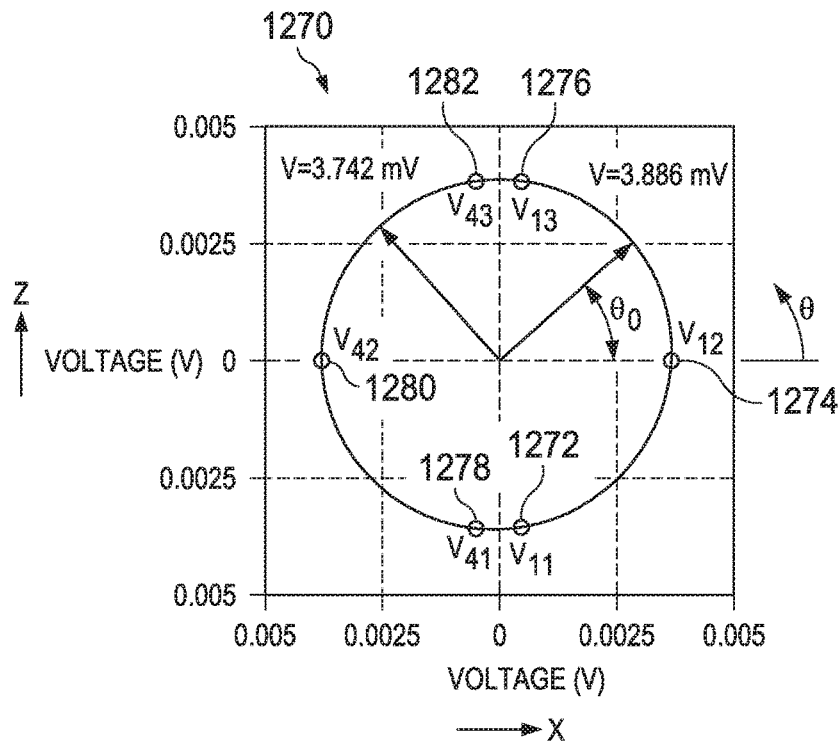
FIGS. 12D-12E are illustrative potential polar plots corresponding to array-based water flood monitoring embodiments.
Figure 12E:
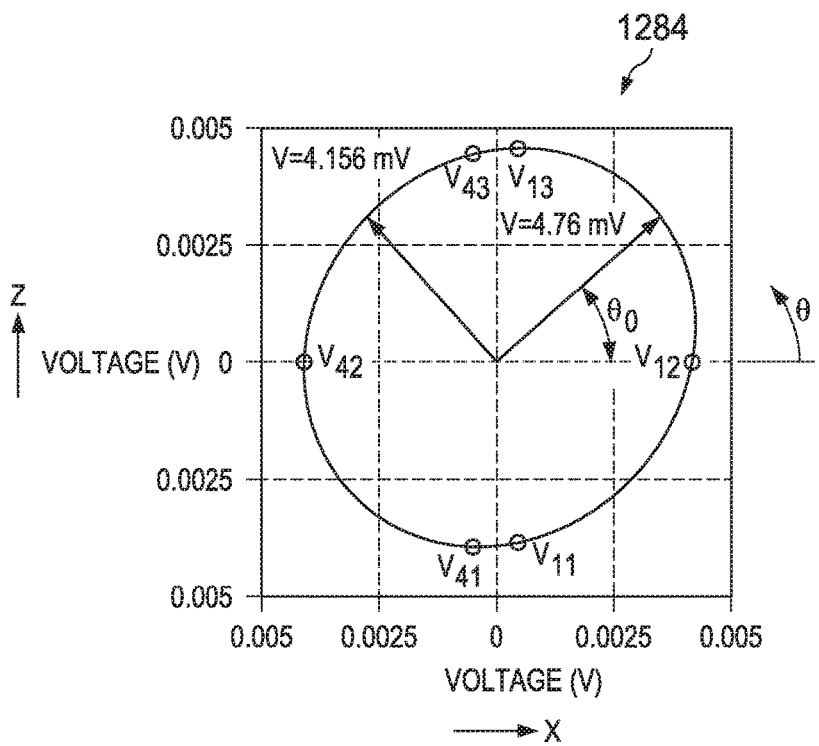

FIGS. 12D and 12E are potential polar plots generated using data collected by the receivers 1204a-1204c. In both of the plots, the azimuthal orientation $\phi$ is kept constant at 0 degrees (i.e., the plots represent the $\phi=0$ degrees plane), while the elevation angle $\theta$ is varied from 0 to 360 degrees. Specifically, plot 1270 in FIG. 12D assumes that the water flood is in the azimuthal direction of $\phi=0$ degrees and plots the interpolated potentials for all values of elevation angle $\theta$ for $\phi=0$. The plot 1270 includes potentials obtained from the electrodes indicated by $V_{11}$ (numeral 1272), $V_{12}$ (numeral 1274), and $V_{13}$ (numeral 1276), as well as potentials obtained from the electrodes indicated by $V_{41}$ (numeral 1278), $V_{42}$ (numeral 1280), and $V_{43}$ (numeral 1282). As the plot 1270 shows, the greatest deformation is present at $\theta=45$ degrees, with an interpolated potential of 3.886 mV and a calculated geometric factor of 0.038. For comparison, the interpolated potential at $\theta=135$ degrees is 3.742 mV. In this example, the plot 1270 is generated when the values for $r_F$ and $z_F$ in FIG. 12A are both 10 feet. Plot 1284 in FIG. 12E includes potentials obtained from the same electrodes as FIG. 12D, with the difference being that in FIG. 12E the water flood is closer ($r_F$ and $z_F$ both are 5 feet) than it is in FIG. 12D. As a result, the interpolated potential at $\theta=45$ degrees is now 4.76 mV and the interpolated potential at $\theta=135$ degrees is now 4.156 mV, resulting in an increasingly apparent deformation near $\theta=45$ degrees. The geometric factor is now 0.145. As explained above, the geometric factor may be inverted to determine the distance to flood in the $\theta=45$ degrees direction.

In summary, regardless of the specific receiver configuration used in a particular environment, a polar plot may be generated using interpolated potentials for all values of $\phi$. The interpolated values are analyzed to identify the largest potential, which corresponds to the area of greatest deformation. The geometric factor is calculated based on the largest potential as described above, and the geometric factor is then inverted to determine the distance to water flood in the corresponding $\phi$ direction. Similarly, a polar plot may be generated using interpolated potentials for all values of the $\theta$ angle. The interpolated values are analyzed to identify the largest potential, which corresponds to the area of greatest deformation. The geometric factor is calculated based on the largest potential as described above, and the geometric factor is then inverted to determine the distance to water flood in the corresponding $\theta$ direction. In this way, the precise location of the water flood is determined.

Numerous other variations and modifications will become apparent to those skilled in the art once the above disclosure is fully appreciated. It is intended that the following claims be interpreted to embrace all such variations, modifications and equivalents. In addition, the term "or" should be interpreted in an inclusive sense.

At least some embodiments are directed to a system for locating water floods, comprising: multiple transducers for coupling to a borehole casing to inject current into a formation within which the casing is disposed; and multiple electrodes, each of the electrodes coupled to a different one of the multiple transducers when coupled to the casing, wherein each of the multiple transducers is used to determine a potential between the casing and a corresponding one of the multiple electrodes to which the transducer is coupled, wherein the potentials from the multiple transducers are used to determine a water flood location. At least some of these embodiments may be supplemented using one or more of the following concepts, in any order and in any combination: further comprising insulative material to control said injection of current into the formation; wherein an axial length said insulative material is equal to or greater than the smaller of a width and a length of one of said multiple electrodes; further comprising insulative padding positioned between said multiple electrodes and the borehole casing; wherein the system uses the potentials to calculate a geometric factor, and wherein the system uses the geometric factor to determine a distance to said water flood location; further comprising a computer that generates a polar plot using said potentials, and wherein said polar plot associates increasing potential with increasing proximity to said water flood location; wherein a first subset of the multiple electrodes is positioned at a different depth than a second subset of the multiple electrodes; further comprising a computer that generates a polar plot using at least some of said potentials, the at least some of said potentials associated with electrodes located at different depths and having a common azimuthal orientation; wherein said potentials are generated at least in part by said injected current, and wherein at least one of the potentials is affected by said water flood location.

At least some embodiments are directed to a system for locating water floods in a formation, comprising: a borehole casing disposed within said formation; multiple electrodes, electrically coupled to the casing via conductive arms, to inject current from the casing into the formation; multiple toroids, coupled to said conductive arms, to detect current flowing through said conductive arms and into the formation via said electrodes; and multiple transducers coupled to the toroids, wherein each of the multiple transducers is used to determine the potential across terminals of a corresponding toroid, wherein the potentials from the multiple transducers are used to determine a water flood location. At least some of these embodiments may be supplemented using one or more of the following concepts, in any order and in any combination: further comprising insulation disposed on the borehole casing, on a casing collar to which the conductive arms couple, on the conductive arms, or a combination of at least two of the foregoing; wherein said injected current is an alternating current having a frequency between 1 KHz and 100 KHz, inclusive; herein the system uses the potentials to calculate a geometric factor, and wherein the system uses the geometric factor to determine a distance to said water flood location; wherein the system calculates and uses scaling weights to normalize the potentials, and wherein the system uses the normalized potentials to calculate said geometric factor; further comprising a computer that generates a polar plot using said potentials, and wherein said polar plot associates increasing potential with increasing proximity to said water flood location; wherein a first subset of the multiple electrodes is positioned at a different depth than a second subset of the multiple electrodes; further comprising a computer that generates a polar plot using at least some of said potentials, the at least some of said potentials associated with electrodes located at different depths and having a common azimuthal orientation.

At least some embodiments are directed to a system to locate water floods in a formation, comprising: multiple electrodes circumferentially disposed on a borehole casing; one or more current sources, electrically coupled to the electrodes, to inject current into the formation via the electrodes; and multiple transducers coupled to said electrodes, wherein each of the multiple transducers is used to determine a potential between the borehole casing and a different one of said electrodes, wherein the potentials from the multiple transducers are used to determine a water flood location. At least some of these embodiments may be supplemented using one or more of the following concepts, in any order and in any combination: further comprising insulative padding positioned between said multiple electrodes and the borehole casing; wherein the potentials measured at two different times are used to determine a time-lapse measurement, and wherein a qualitative assessment of the water flood is performed using the time-lapse measurement.

The invention claimed is:

1. A system for locating water floods, comprising:
at least one current source coupled to a borehole casing to inject current into a formation within which the casing is disposed; and
multiple electrodes coupled to the casing, each of the electrodes coupled to a different one of multiple transducers,
wherein each of the multiple transducers is used to determine a potential between the casing and a corresponding one of the multiple electrodes to which the transducer is coupled,
wherein the potentials from the multiple transducers are used to determine a water flood location.

2. The system of claim 1, further comprising insulative material to control said injection of current into the formation.

3. The system of claim 2, wherein an axial length of said insulative material is equal to or greater than the smaller of a width and a length of one of said multiple electrodes.

4. The system of claim 1, further comprising insulative padding positioned between said multiple electrodes and the borehole casing.

5. The system of claim 1, wherein the system uses the potentials to calculate a geometric factor, and wherein the system uses the geometric factor to determine a distance to said water flood location.

6. The system of claim 1, further comprising a computer that generates a polar plot using said potentials, and wherein said polar plot associates increasing potential with increasing proximity to said water flood location.

7. The system of claim 1, wherein a first subset of the multiple electrodes is positioned at a different depth than a second subset of the multiple electrodes.

8. The system of claim 7, further comprising a computer that generates a polar plot using at least some of said potentials, the at least some of said potentials associated with electrodes located at different depths and having a common azimuthal orientation.

9. The system of claim 1, wherein said potentials are generated at least in part by said injected current, and wherein at least one of the potentials is affected by said water flood location.

10. A system for locating water floods in a formation, comprising:
a borehole casing disposed within said formation;
multiple electrodes, electrically coupled to the casing via conductive arms, to inject current from the casing into the formation;
multiple toroids, coupled to said conductive arms, to detect current flowing through said conductive arms and into the formation via said electrodes; and
multiple transducers coupled to the toroids,
wherein each of the multiple transducers is used to determine a potential across terminals of a corresponding toroid,
wherein the potentials from the multiple transducers are used to determine a water flood location.

11. The system of claim 10, further comprising insulation disposed on the borehole casing, on a casing collar to which the conductive arms couple, on the conductive arms, or a combination of at least two of the foregoing.

12. The system of claim 10, wherein said injected current is an alternating current having a frequency between 1 KHz and 100 KHz, inclusive.

13. The system of claim 10, wherein the system uses the potentials to calculate a geometric factor, and wherein the system uses the geometric factor to determine a distance to said water flood location.

14. The system of claim 13, wherein the system calculates and uses scaling weights to normalize the potentials, and wherein the system uses the normalized potentials to calculate said geometric factor.

15. The system of claim 10, further comprising a computer that generates a polar plot using said potentials, and wherein said polar plot associates increasing potential with increasing proximity to said water flood location.

16. The system of claim 10, wherein a first subset of the multiple electrodes is positioned at a different depth than a second subset of the multiple electrodes.

17. The system of claim 16, further comprising a computer that generates a polar plot using at least some of said potentials, the at least some of said potentials associated with electrodes located at different depths and having a common azimuthal orientation.

18. A system to locate water floods in a formation, comprising:
multiple electrodes circumferentially disposed on a borehole casing;
one or more current sources, electrically coupled to the electrodes, to inject current into the formation via the electrodes; and
multiple transducers coupled to said electrodes,
wherein each of the multiple transducers is used to determine a potential between the borehole casing and a different one of said multiple electrodes,
wherein the potentials from the multiple transducers are used to determine a water flood location.

19. The system of claim 18, further comprising insulative padding positioned between said multiple electrodes and the borehole casing.

20. The system of claim 18, wherein the potentials measured at two different times are used to determine a time-lapse measurement, and wherein a qualitative assessment of the water flood is performed using the time-lapse measurement.

* * * * *